2,305,031

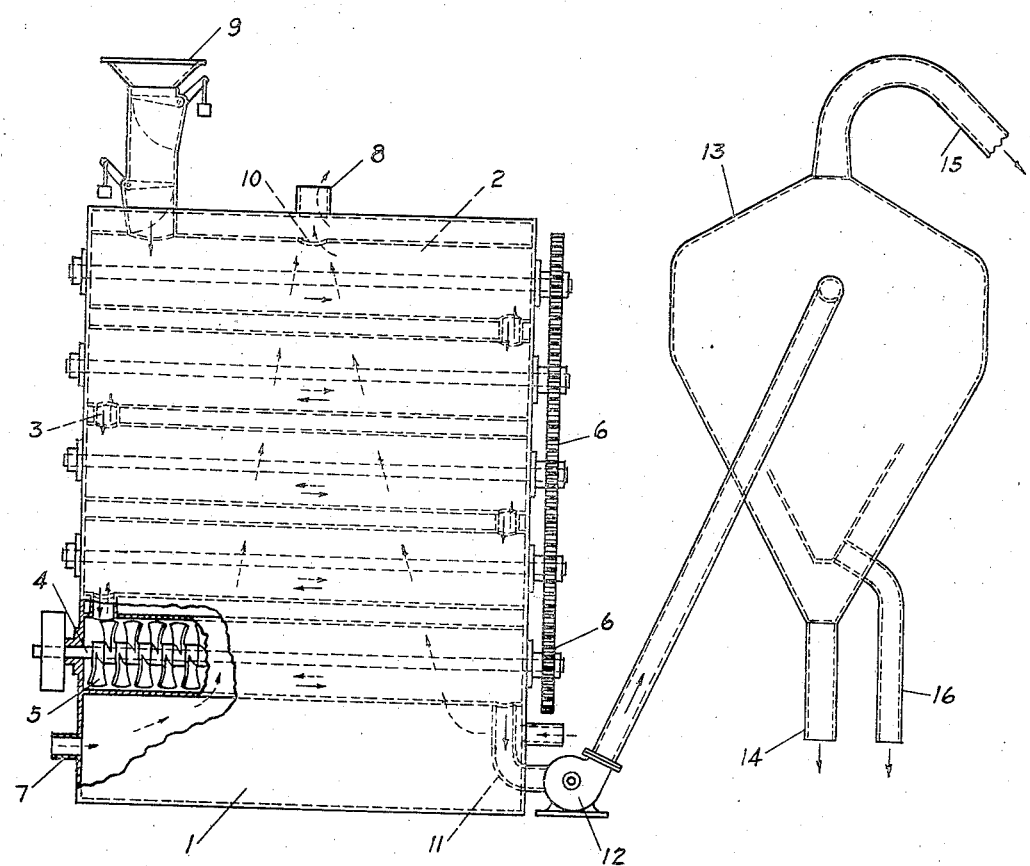
INVENTORS
RUSSELL S. RAREY
EDMUND C. POWERS
BY *H. S. Babcock*
ATTORNEY Patented Dec. 15, 1942

UNITED STATES PATENT OFFICE 2,305,031

PROCESS OF MAKING ANHYDROUS LIME POWDER

Russell S. Rarey and Edmund C. Powers, Columbus, Ohio, assignors to Marble Cliff Quarries Company, Columbus, Ohio Application May 22, 1939, Serial No. 274,932

7 Claims. (Cl. 23—186)

The present invention relates to a process of making a lime powder.

Hydrated lime is a well known commercial product, made, sold and used in tremendous quantities throughout this country. It is, in ordinary parlance, dry, and in the form of a fine white powder. While dry in appearance and feeling, actually, it contains a relatively large percentage of chemically combined water, approximately 15 to 27% and a small percentage of free water. As a fact, commercial hydrated lime frequently contains as much as a total of approximately 30% water (free and combined), or slightly less than ⅓ of its total weight. The exact proportion of combined water is, of course, invariable and exactly determinable for any lime of a given analysis. The amount of free water is variable, within narrow ranges. The exact proportion of water required to completely hydrate a given quantity of quick lime is well known. For best commercial results, water is added to within a fraction of 1% of that required for complete hydration. All water will be incorporated and most of it as combined water, with due allowance for evaporation. There will be no slightest dampness in the mass and the powdered form of molecular or extreme fineness will be maintained. On the other hand, if there is a very slight bit of quick lime left, it will be in such fine particles, after the regular screening to remove small impurities, that there would be no appreciable swelling in case it should contact moisture. On the other hand, if slightly more than enough water were added to make absolutely certain of complete hydration, there would not be the desirable dryness. There would be a damp condition and added weight. From a production and practical point of view, therefore, it has been customary to add very slightly less than the actual amount of water required. A difficulty in that is that sometimes not quite enough water is added, with the result that the proportion of lime remaining unslaked or unhydrated is such as to cause appreciable swelling and bursting of the containers, in which it is regularly shipped.

The chemical action of producing hydrated lime by addition of water to the oxide results in molecular or extremely fine subdivision producing the fine powder of the hydrate. After the usual crushing preliminary to hydration, the lime ranges from about 1½" to dust, in size and is still solid and hard. On condition of water and resulting chemical action, this crushed lime is completely and entirely converted into a white powder of molecular or extreme fineness and containing the added water, frequently, to the extent of nearly ⅓ of the total weight of the hydrate. During hydration, as is well known, quick lime swells rapidly, greatly and with evolution of much heat and the generation of a high temperature. Thus, insufficiently hydrated lime in a bag, in contact with moisture, will quickly swell enough to burst the bag.

This hydrated lime of such extremely finely powdered condition, when heated, becomes a mixed granular mass full of many hard lumps and cakes which requires further processing. Thus, hydrated lime from which the water has been driven off by heat, without other processing, is not a fine dry powder like the hydrate, nor, yet, has it returned to the hard dry small lumps or pieces of the crushed lime. It is neither the one nor the other. This caking or lumping difficulty is clearly set forth or disclosed in Patents 543,452 and 599,792, both of which clearly refer to solidification on heating. They both state that the resulting product must be ground. The same difficulty is clearly indicated in Patent 680,453, which makes provision to offset the difficulty.

The main objects of the present invention are to completely eliminate the above and other disadvantages in the removal of water from the hydrate and to continuously produce a substantially dry lime powder of molecular or extremely fine subdivision, ready for use on the job in exactly the same way and with the same results as commercial hydrated lime.

By the present invention, the extremely fine physical condition is retained. The material starts as a powder of molecular or extreme fineness and ends as a powder of similar fineness. In appearance and fineness of the powder, the product at finish is the same or even finer than at the start. However, the starting product is hydrous or a hydrate containing a very large proportion of water, the greater part of which is fixed or water of constitution, whereas, the finished or final product contains neither combined nor free water. The final product is proportionately lighter per unit of volume. The starting product is hydrated lime, while the final product is a new form of lime or calcium oxide. It is calcium oxide in the form of a powder of extreme fineness and having characteristics peculiar to that fine state of subdivision. The final product, nevertheless, is capable of all of the uses of the hydrate, both chemical and mechanical.

While a wide range of apparatus and equipment may be used in carrying out the process of this invention and in producing the resulting product, one, only, has been shown in the drawings and that diagrammatically, in order to somewhat more clearly and definitely set forth the invention.

The single figure of the drawing is a diagrammatic view showing a well known type of heater, in front elevation with part of the near wall broken away to show the cylinders, and a connected standard cyclone separator.

As a simple illustration of the process, assume that we have a quantity of standard hydrated lime. It is, of course, in powder form of molecular or extreme fineness. To touch and sight it is thoroughly dry. Actually, by chemical analysis, it will be found to contain a small amount of free water and a considerable percentage of combined water, the total of free and combined water running as high as 30% in many cases. As is well known, this hydrate is usually sold in paper bags of 50 pounds weight. Because of the finely powdered condition of the hydrate and because it already contains its full proportion of combined water or water of constitution, it will not swell on contact with moisture or additional water. Therefore, even if the paper bag is accidentally moistened at one point or another there will be no swelling and no bag bursting unless, as is sometimes the case, an excess of quick lime has accidentally remained in the bag. On the other hand, quick lime, however, finely divided, ground or pulverized, mechanically, on the addition of water, will act the same as though it had not been pulverized, and that is true even if the subdivision be finer than that resulting from hydration. It will swell greatly, rapidly, with evolution of great heat, and will generate a high temperature. It can not be mechanically reduced to such a fine degree of subdivision that it will not have the above reactions of quick lime. Quick lime will absorb sufficient moisture even from the atmosphere to slake, swell and destroy its containers. And this is true regardless of the finest possible mechanical grinding or reduction, and during such action it generates a great deal of heat and a high temperature, creating a very serious and dangerous fire hazard.

The heater illustrated comprises a large chamber or oven 1 of substantially rectangular or box-like construction, in which are suitably mounted a plurality of horizontal closed cylinders 2, arranged as a vertical stack, one above another. Each cylinder, at one end, communicates with the one below, through a suitable side chute 3. Extending the full length of each cylinder is a revoluble shaft 4 with mixing and feeding blades or paddles 5. These blades are so positioned on the shaft as to propel the material lengthwise within the respective cylinder toward chute 3 leading from it to the next below and, at the same time, to keep the hydrate thoroughly and continuously stirred, mixed and agitated.

As blades 5 revolve through the hydrate within the respective cylinders 2 to stir the hydrate and feed it steadily, progressively forward, there is, obviously, appreciable rubbing, grinding or attrition of the hydrate by the blades and between the blades and the enclosing walls of cylinders 2, further reducing the size of the ultimate particles. Preferably, each shaft, at one end, is provided with a gear 6, the several gears intermeshing as a train, so that, by driving any one all will be driven. Alternate shafts will, of course, rotate oppositely. This causes alternate reversal of direction of feed, as desired, so that the hydrate dropping from one cylinder to the next below will travel in the opposite direction. This sinuous path gives ample opportunity for heating. Heat is supplied to the oven through suitable ducts 7 in any desired number and arrangement, passing up through the stack of cylinders and out through one or more flues 8. The hydrated lime is fed through a well known type of hopper 9 through the upper side of one end of the top cylinder and thence sinuously, as above indicated. The steam and other products of evaporation follow an upward sinuous path reverse to that of the path of the lime, to an outlet flue 10 leading from the upper cylinder. As the lime reaches the end of its sinuous path it passes into the chute 11 leading to blower 12 which delivers it to the top of a well known cyclone separator 13 from which the final product is delivered through 14, the extreme fines escaping through 15, from the upper part of the separator, the heavier impurities being separated, in the usual manner by the inner cone and passing out through the outlet 16, in the usual and well known manner. The solid arrows indicate the downward sinuous path of the lime through the cylinders, while the dotted arrows indicate the upward flow of steam and the products of evaporation.

It will be understood that the apparatus shown is merely illustrative and with no thought of approximately proper relative proportions. It is more in the nature of a diagram or flow sheet, showing the order or sequence of the steps of the process. A great many other couples (furnace or oven and separator) may serve very well, while yet being constructed, proportioned and arranged far differently. Likewise apparatus and equipment of an entirely different type and operation may be used for the same processes and purposes.

The process is continuous as long as its operation is desired. As fast as the hydrate is delivered to the cylinders 2, the dehydrated lime powder passes to the separator and the final separated product leaves the separator. The resulting final product is a dry lime powder of molecular or extremely fine condition of subdivision. Because of the extremely fine subdivision, this lime powder which is lime or calcium oxide of a modified character, will not swell and burst its containers when contacted by moisture. It acts the same as hydrated lime in that respect, or contrary to ordinary quick lime. However, in use, proportionately more water is required for it than for hydrated lime. In mixing for various uses, it will absorb proportionately more water than hydrated lime. It is, however, equally applicable to all of the uses of standard hydrated lime.

At this point it will not be amiss to state that heat may be applied in any desired practical manner. It has been shown as hot air applied through ducts to an oven enclosing the cylinders. Instead, electric resistance coils, or any one of a wide variety of heat transferring means, either direct or indirect, may be used.

While it has been indicated above in somewhat general terms that, for a hydrate containing 30% water, a given volume of the resulting lime powder would weigh approximately a certain number of pounds less, specific examples will be given. In this connection, it must be born in mind that commercial hydrated lime, as regularly sold on the market, in tremendous quantities, is not all the same. There, are, generally speaking, three grades or types recognized in the business and referred to respectively as high calcium, high magnesium or dolomite and intermediate. The classification is approximate and they overlap somewhat. The high calcium limes, when hydrated, take up higher percentages of water than either of the others, the high magnesium limes take up lower percentages of water than either of the others and the intermediate take up intermediate amounts of water and, conversely, upon dehydration, the high calcium hydrates show highest percentage loss, the high magnesium lowest percentage loss and the intermediate an intermediate percentage of loss. As an illustration, the following brief tabular statement, giving one sample falling within each of these three general grades, may be referred to:—

| Type | Approximate water content | Approximate net weight |
|---|---|---|
|  | Per cent | Pounds |
| (1) High calcium | 23–26 | 37 –38½ |
| (2) Intermediate grade | 20–23 | 38½–40 |
| (3) High magnesium | 17–20 | 40 –41½ |

Applying the process of this invention, 50 lbs. of each of the above types of lime gave the following results: Fifty lbs. of high calcium lime was fed through the cylinders during a period of 14 minutes, the temperature being maintained at 600 C., with a final weight of 37 to 38½ lbs. or a loss of 25% to 22% in weight. The same test was made but with temperature at 500 C. for 30 minutes, with the same result. Then 50 lbs. of intermediate grade was similarly tested. At 600 C. for 14 minutes, the final product weighed 38½ to 40 lbs. or a loss of 23% to 20%. Then a magnesium type was tested. At 600 C. for 14 minutes it showed final weight of 40 to 41½ or a loss of 20% to 17%. In all cases the final product was completely dehydrated and the product was a dry lime powder.

Various other temperatures and times were tried with the same amounts of lime of different types and having varying percentages of water of hydration. For the intermediate type of hydrate with 20% to 23% of water the following results were obtained.

| Time | Temperature | Loss of weight |
|---|---|---|
|  | Centigrade | Per cent |
| 10 min | 500 | 8.1 |
| 30 min | 500 | 15.7 |
| 60 min | 500 | 17.7 |
| 14 min | 600 | 18.9 |
| 30 min | 450 | 15.42 |

The hydrate may be heated for a considerable length of time at the lower temperatures or for a shorter period at the higher temperatures, apparently, with approximately the same results, as to dehydration. The most efficient, commercially, appears to be heating to about 600 C. At that temperature, dehydration is approximately completed in about 14 minutes. On the other hand, at 500 C. a period of 30 minutes leaves 3% more water than 14 minutes at 600 C., and, even, at 60 minutes, that 500 C. temperature leaves 1% more moisture than the 14 minutes at 600 C. And at 500 C. for 10 minutes there is less than ½ as much moisture removed as at 600 C. for only 14 minutes. At 450 C. the first combined water or water of constitution, apparently, is driven off. It is noticeable that 30 minutes at 450 C. and at 500 C. differ less than ½% in the amount of water driven off. Below 450 C., it is probable that only water that is not combined (free water) is driven off. In regular commercial hydrates this is usually not over 3%. The free water may, of course, be driven off at any point above 100 C. (boiling point). Thus, 100 C. is the lowest point for driving off any water, and 450 C., about, is the lowest limit for driving off any combined water. The upper limit is determined by the fusion point of impurities in the lime, which is, usually, about 900 C. At, or slightly over 900 C. there is fusion and clinkers and, therefore, various objections.

As above pointed out, heating at 600 C. requires less time (14 minutes) than heating at 500 C. As the temperature rises, other factors remaining unchanged, the time required decreases. At temperatures between 600 C. and the fusion point (around 900 C.) the time will be reduced appreciably below 14 minutes. The most economical application of the process, as to time and temperature, will depend upon a number of factors varying considerably with the individual plant and particularly with reference to its equipment for carrying out the process. In general, it is believed that heating at a temperature of 600 C. for a period of 14 minutes will be found, with most equipment, the most economical application of the process.

It has been stated that the product resulting from this process is a new form of lime or calcium oxide. This statement, obviously, is not meant to be interpreted in the technical sense imparting all characteristics of calcium oxide. The lime powder in the new form and with the characteristics resulting from this process, expressly does not have several important characteristics of quick lime, as technically designated. The new lime powder, for instance, does not swell rapidly and greatly, as does true quick lime on addition of water, nor does it evolve heat or show the rise in temperature characteristic of true quick lime. More properly speaking, possibly, it is a product between quick lime and hydrated lime. It possesses the molecular or extreme fineness of subdivision and bulk of hydrated lime. Possibly, it may be even finer in subdivision than hydrated lime, because from each and every molecule of hydrated lime the chemically combined water of constitution has been driven off, altering the molecules to that extent and, possibly, disrupting them and breaking them down into finer subdivisions. It has all of the properties of hydrated lime which make it useful in various ways. It may be used equally well in all uses in which hydrated lime may be used, including all of the chemical uses. On the other hand, it is entirely lacking in the relatively large proportion of water characteristic of hydrated lime. Although totally lacking in that water content, its volume is in no degree changed— i. e. one cubic foot of hydrated lime, when treated according to this process, still occupies 1 cubic foot. Likewise, 1 cubic foot of this lime powder, having added to it the full amount of water that has been driven off during the process, produces a lime putty of less volume than 1 cubic foot, because the water added acts as a lubricant for the lime particles which settle and pack into smaller volume. Its weight will be increased to the extent of the weight of the water added, and its volume will be decreased.

Preferably, the hydrate treated is the regular commercial hydrate containing only the necessary water content to make it a hydrate. However, a hydrate with a greater water content may be used. Lime putty may be used, or even lime which is in a semi-fluid condition. Of course, in all such cases, there is a corresponding increase in the expense involved in driving off the additional water.

Whatever the water content of the hydrate or its physical condition, it is fed continuously into and through the cylinders, and, as it progresses through them, all of it is kept continuously agitated or stirred, so that it will not cake, lump, pack or solidify or become granular. It issues as a dry powder of molecular or extreme fineness approximately free of all water or anhydrous. It has most of the desirable characteristics of both quick lime and hydrated lime and most of their desirable properties and none of the objectionable characteristics of either. It is much lighter than hydrated lime and costs correspondingly less in transportation and handling costs. Due to the fact, probably, that the final product retains approximately the volume of the original hydrate, yet has been concentrated by the removal of its water content, it has a far greater proportion of voids throughout than the original hydrate, resulting in quicker and more intimate contact and reaction with added water. Thus, the usual chemical reaction is facilitated and speeded, relatively to that of the regular commercial hydrate.

Throughout the specification and claims it is to be clearly understood that the terms lime and calcium oxide are used in a representative sense and that each, where ever used, shall and does include the other and shall have reference to all limes and calcium oxides whether high calcium, intermediate, high magnesium, or any other grade.

It is believed that the process and product of this invention, and the several steps of performing the process, as well as the equipment required, will be clear from the preceding detailed description.

Having thus described our invention, what we claim and desire to protect by Letters Patent is:

1. A process of removing water of hydration from hydrated lime without reducing the volume thereof to produce a dry lime powder, comprising heating said hydrated lime to a temperature between 450° C. and 600° C. for a sufficient period of time to remove substantially all of the water of hydration, and throughout said heating period subjecting said hydrated lime to such agitation and attrition as will maintain its bulk volume not reduced and in a state of fine subdivision.

2. A process of removing water of hydration from hydrated lime, without reducing the volume thereof to produce a dry lime powder, comprising heating said hydrated lime to a temperature between 450° C. and 900° C. for a sufficient period of time to remove substantially all of the water of hydration, and throughout said heating period subjecting said hydrated lime to such agitation and attrition as will maintain its bulk volume not reduced and in a state of fine subdivision.

3. A process of removing water of hydration from hydrated lime, without reducing the volume thereof, to produce a dry lime powder, comprising heating hydrated lime to a temperature which will drive off substantially all of the water of hydration, maintaining that temperature for a sufficient period to remove substantially all of the water of hydration, and, throughout said heating period subjecting said hydrated lime to such agitation and attrition as will maintain its bulk volume not reduced and in a state of fine subdivision.

4. A process of removing water of hydration from hydrated lime, without reducing the volume thereof, to produce a dry lime powder, comprising heating said hydrated lime to a temperature between 450° C. and 600° C. for a sufficient period of time to remove substantially all of the water of hydration, and throughout said heating period subjecting said hydrated lime to such agitation and attrition as will maintain its bulk volume not reduced and in a state of fine subdivision, and subjecting the resulting product to air separation to remove the heavier impurities.

5. An anhydrous lime powder prepared according to claim 1 having an ultimate particle size so fine that said powder has no tendency to swell on hydration.

6. An anhydrous lime powder prepared according to claim 2 having an ultimate particle size so fine that said powder has no tendency to swell on hydration.

7. An anhydrous lime powder prepared according to claim 3 having an ultimate particle size so fine that said powder has no tendency to swell on hydration.

RUSSELL S. RAREY.
EDMUND C. POWERS.